(12) United States Patent
Okada (10) Patent No.: US 7,642,678 B2
(45) Date of Patent: Jan. 5, 2010

(54) LINEAR MOTOR AND MACHINE TOOL HAVING THE SAME MOUNTED THEREON

(75) Inventor: Takuya Okada, Kyoto (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 84 days.

(21) Appl. No.: 11/842,488

(22) Filed: Aug. 21, 2007

(65) Prior Publication Data

US 2008/0042495 A1 Feb. 21, 2008

(30) Foreign Application Priority Data

Aug. 21, 2006 (JP) .............................. 2006-223786

(51) Int. Cl.
*H02K 41/02* (2006.01)
(52) U.S. Cl. .............................. 310/12; 310/22; 310/24; 310/33; 310/14; 310/15; 100/258
(58) Field of Classification Search ............. 310/12–35, 310/101; 100/258
See application file for complete search history.

(56) References Cited

U.S. PATENT DOCUMENTS

| 5,872,407 | A  | * | 2/1999  | Kitaoka et al. | ............ | 310/12.14 |
| 6,821,103 | B2 | * | 11/2004 | Tokuyama et al. | ........... | 425/145 |
| 6,825,582 | B2 | * | 11/2004 | Hehl | ............................ | 310/12 |
| 2001/0028903 | A1 | * | 10/2001 | Koide et al. | ................. | 425/556 |
| 2003/0185091 | A1 | * | 10/2003 | Koike et al. | .................... | 366/92 |
| 2004/0201290 | A1 | * | 10/2004 | Razzaghi | ....................... | 310/15 |
| 2005/0212362 | A1 | * | 9/2005  | Emoto | .......................... | 310/12 |
| 2006/0028072 | A1 | * | 2/2006  | Iwasa et al. | .................... | 310/14 |
| 2006/0147578 | A1 | * | 7/2006  | Konno | ......................... | 425/592 |

FOREIGN PATENT DOCUMENTS

| JP | 10-313566 A | 11/1998 |
| JP | 2001-352747 A | 12/2001 |
| JP | 2004-072853 A | 3/2004 |

* cited by examiner

*Primary Examiner*—Quyen Leung
*Assistant Examiner*—John K Kim
(74) *Attorney, Agent, or Firm*—Westerman, Hattori, Daniels & Adrian, LLP (57) ABSTRACT

The present invention provides a linear motor 1 which uses a plurality of cylindrical linear motors 2 to increase power and which can guide forward and backward movements using a simple configuration, the linear motor 1 requiring reduced manufacturing costs. A plurality of cylindrical linear motors 2 are provided each of which has a shaft member 3 made of a permanent magnet and a coil unit 4. A motor support 25 is provided which is able to support the coil units of the plurality of cylindrical linear motors 2 arranged in parallel. The shaft members of the plurality of cylindrical linear motors 2 are coupled together at ends thereof by coupling members 10, 11. A guide mechanism 32 is located inside the arrangement of the cylindrical linear motors 2 to guide movement of the shaft members 3 of the cylindrical linear motors 2. The number of guide mechanisms 32 is smaller than that of the cylindrical linear motors 2. For example, the single guide mechanism 32 is provided.

4 Claims, 6 Drawing Sheets

LINEAR MOTOR AND MACHINE TOOL HAVING THE SAME MOUNTED THEREON

FIELD OF THE INVENTION

The present invention relates to a linear motor and a machine tool such as a press machine in which the linear motor is mounted.

BACKGROUND OF THE INVENTION

Proposals have been made of a linear motor comprising a shaft member made of a permanent magnet having alternately arranged N and S poles, and a coil unit having a plurality of coils arranged in an axial direction so as to surround the shaft member (see, for example, the Unexamined Japanese Patent Application Publication (Tokkai-Hei) No. 10-313566).

The linear motor disclosed in the Unexamined Japanese Patent Application Publication (Tokkai-Hei) No. 10-313566 is used in OA equipment or the like, for example, in place of a combination of a rotary motor and a ball screw. Also for machine tools such as press machines which make direct-acting motion, the use of the linear motor simplifies the configuration and enhances controllability. However, when the linear motor is used for the press machine, a high thrust needs to be obtained. The linear motor generally uses a permanent magnet with a strong magnetic force. However, it is difficult to manufacture linear motors each generating a high thrust, because of manufacturing limits on the size of the magnet and restrictions on a supplied voltage and the like.

A linear motor having a plurality of juxtaposed cylindrical linear motors has been proposed. However, in this linear motor, each of the cylindrical linear motors has a guide mechanism that moves a shaft member forward and backward with respect to a coil unit. Thus, disadvantageously, the linear motor has a large, complicated structure, increasing costs.

SUMMARY OF THE INVENTION

It is an object of the present invention to provide a linear motor which uses a plurality of cylindrical linear motors to increase power and which can guide forward and backward movements using a simple configuration, the linear motor requiring reduced manufacturing costs.

It is another object of the present invention to provide a compact configuration.

It is yet another object of the present invention to provide a compact configuration that can provide a rotation locking function.

It is still another object of the present invention to provide a linear motor mounted machine tool requiring a reduced number of parts and having a simple structure.

A linear motor in accordance with the present invention comprises a plurality of cylindrical linear motors each having a shaft member comprising a permanent magnet and a coil unit through which the shaft member is movable relative to the coil unit, a motor support that is able to support the coil units of the plurality of cylindrical linear motors arranged in parallel, a coupling member that couples the shaft members of the plurality of cylindrical linear motors together at ends thereof, and a guide mechanism located inside the arrangement of the cylindrical linear motors so that the number of guide mechanisms is smaller than that of the cylindrical linear motors, the guide mechanism guiding movement of the shaft members of the cylindrical linear motors. In this configuration, the plurality of cylindrical linear motors are arranged in parallel, allowing outputs from the individual cylindrical linear motors to be collectively utilized to obtain high power. Further, the guide mechanism guiding the shaft members of the plurality of cylindrical linear motors is located inside the arrangement of the cylindrical linear motors. The number of guide mechanisms is smaller than that of the cylindrical linear motors. This results in a simpler configuration than the case where each of the cylindrical linear motors has a guide mechanism, enabling a reduction in manufacturing costs.

According to the present invention, the guide mechanism comprises a guiding portion and a guided portion which are provided on the coupling member and the motor support, respectively, and which are movable in an axial direction. The thus configured guide mechanism makes it possible to provide a compact configuration.

With this arrangement, the single guide mechanism may be provided in a center of the arrangement of the cylindrical linear motors and may have a rotation locking means comprising an axial groove and a key portion that engages with the groove so as to be movable in an axial direction relative to the groove. This arrangement requires the single guide mechanism, enabling a more compact and simple configuration. Further, in spite of the single guide mechanism, the provision of the rotation locking mechanism prevents the shaft members of the plurality of cylindrical linear motors coupled together by the coupling member from starting to rotate around the guide mechanism to create a nonuniform gap between the shaft member and the coil unit.

A linear motor mounted machine tool in accordance with the preset invention comprising the linear motor in accordance with the present invention having any of the above configurations and a movable portion that is moved forward and backward by the linear motor to move a tool or a workpiece.

The term "machine tool" as used herein refers to "machine tools" in a broad sense which include not only machines such as lathes which perform cutting operations but also machines in general which machine materials. The machine tool includes punch presses and other press machines. In this configuration, the movable portion that moves forward and backward is driven by the linear motor. Unlike machine tools using a rotary motor, this configuration eliminates the need for a mechanism that converts rotation into rectilinear motion. This reduces the number of parts required, simplifying the structure of the machine tool. Further, the linear motor, serving as a driving source, comprises cylindrical linear motors arranged in parallel and adjacent to one another. This makes it possible to provide high power using the compact configuration.

The linear motor in accordance with the present invention comprises the plurality of cylindrical linear motors each having the shaft member comprising the permanent magnet and the coil unit through which the shaft member is movable relative to the coil unit, the motor support that is able to support the coil units of the plurality of cylindrical linear motors arranged in parallel, the coupling member that couples the shaft members of the plurality of cylindrical linear motors together at ends thereof, and the guide mechanism located inside the arrangement of the cylindrical linear motors so that the number of guide mechanisms is smaller than that of the cylindrical linear motors, the guide mechanism guiding movement of the shaft members of the cylindrical linear motors. Thus, the plurality of cylindrical linear motors can be used to increase power. Further, the linear motor can guide forward and backward movements using the simple configuration, and can be manufactured at reduced costs.

When the guide mechanism comprises the guiding portion and the guided portion which are provided on the coupling member and the motor support, respectively, and which are movable in the axial direction, the linear motor can have a compact configuration.

When the single guide mechanism is provided in a center of the arrangement of the cylindrical linear motors and has the rotation locking means comprising an axial groove and a key portion that engages with the groove so as to be movable in an axial direction relative to the groove, the linear motor can have a compact configuration providing a rotation locking function.

The linear motor mounted machine tool in accordance with the preset invention comprises the linear motor in accordance with the present invention having any of the above configurations and a movable portion that is moved forward and backward by the linear motor to move a tool or a workpiece. This makes it possible to reduce the number of parts required and to simplify the structure.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
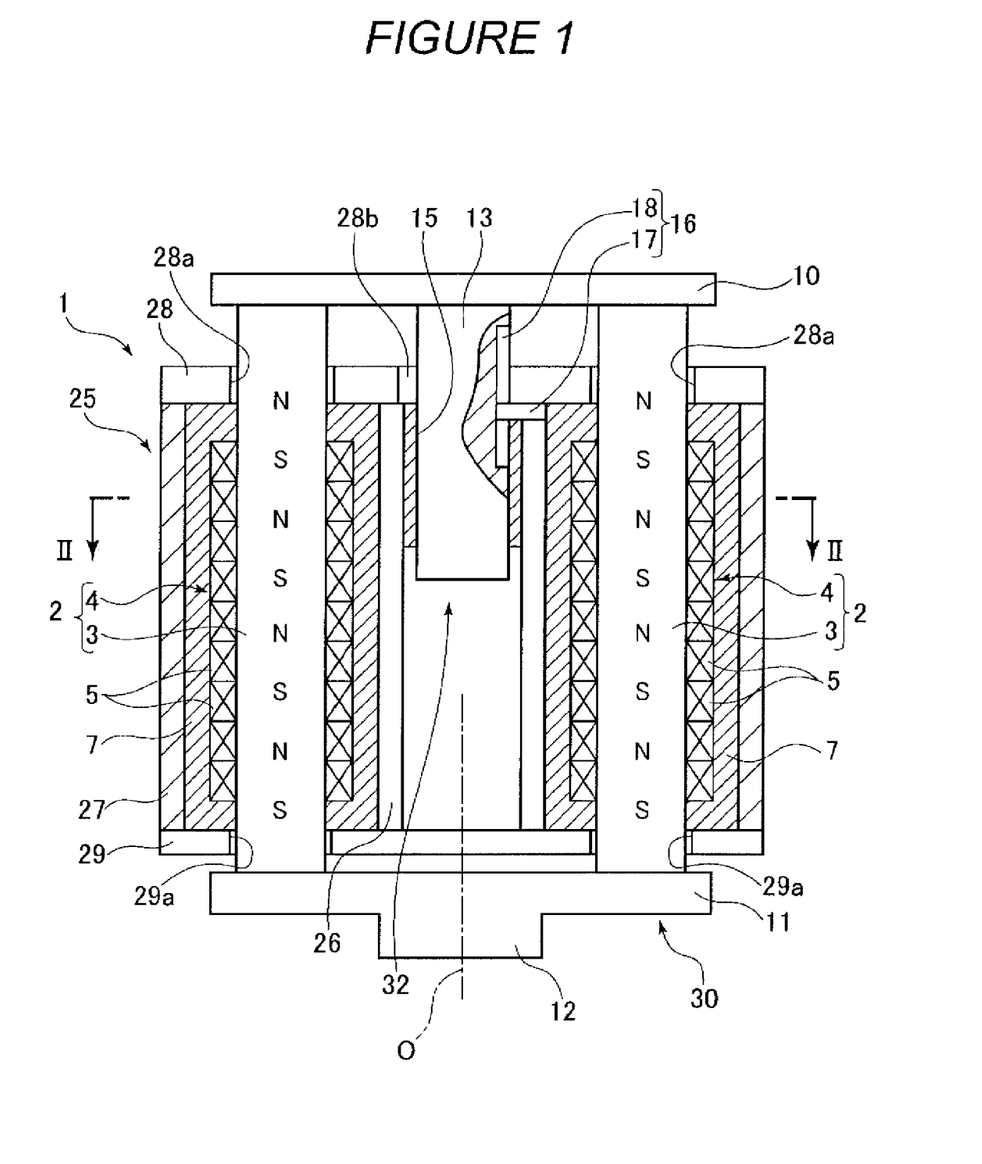
FIG. 1 is a vertical sectional view of a linear motor in accordance with a first embodiment of the present invention.
Figure 2:
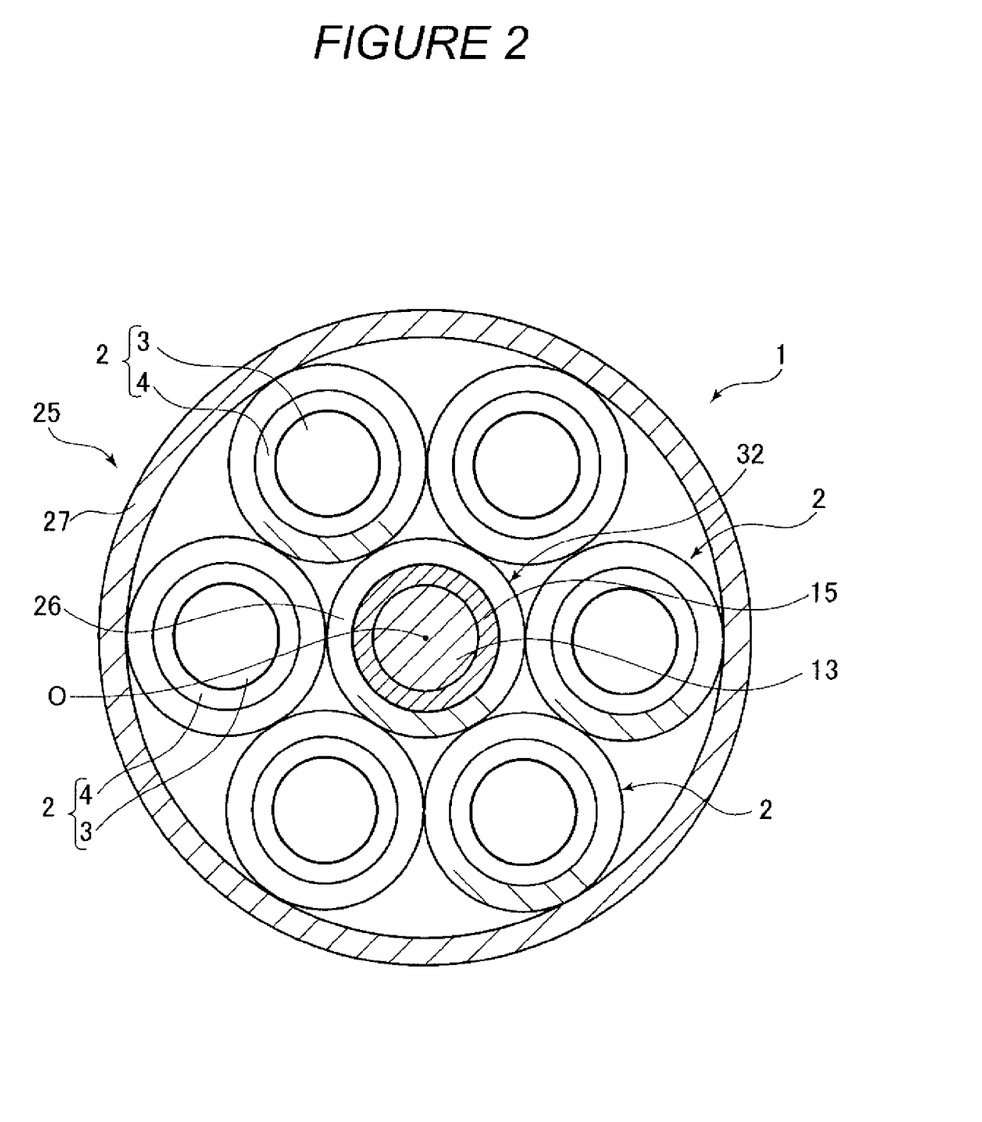
FIG. 2 is a sectional view taken along line II-II in FIG. 1.

A first embodiment of the present invention will be described with reference to FIG. 1 and FIG. 2. The linear motor 1 has a plurality of cylindrical linear motors 2 arranged in a motor support 25. In the parallel arrangement form in this example, a plurality of the cylindrical linear motors 2 constructed in accordance with the same specifications are arranged on a virtual circle around the output shaft center O in its circumferential direction.

Each of the cylindrical linear motors 2 is composed of a shaft member 3 made of a permanent magnet having alternately arranged N and S poles, and a coil unit 4 through which the shaft member 3 is movable in the axial direction relative to the coil unit 4. The coil unit 4 is constructed by arranging a plurality of coils 5 surrounding the periphery of the shaft member 3, in a cylindrical coil case 7 in an axial direction. The coil unit 4 serves as a stator, and the shaft member 3 serves as a moving member. The shaft member 3 is made of one round-bar-like member but may be a plurality of permanent magnets arranged in the axial direction.

The motor support 25 has an inner cylinder 26 and an outer cylinder 27 which are concentrically arranged. One ends of the inner cylinder 26 and the outer cylinder 27 are coupled together by an end plate 28, and other ends of the inner cylinder 26 and the outer cylinder 27 are coupled together by an end plate 29. Each cylindrical linear motor 2 is arranged in the annular space between the inner cylinder 26 and the outer cylinder 27 in the circumferential direction. The end plates 28, 29 have a plurality of shaft member through-holes 28a, 29a through which the shaft members 3 of the respective cylindrical linear motors 2 are inserted. The end plate 28 has a guide shaft through-hole 28b in its center.

One ends of the shaft members 3 of the cylindrical linear motors 2 are coupled together by a coupling member 10, and other ends of the shaft members 3 of the cylindrical linear motors 2 are coupled together by a coupling member 11. The plurality of shaft members 3 and the coupling members 10, 11 constitute a moving member 30. An output shaft 12 located at the center O of the arrangement of the cylindrical linear motors 2 is formed on the coupling member 11 of the moving member 30.

A guide mechanism 32 is provided between the motor support 25 and the moving member 30 to guide movement of the shaft members 3 of the plurality of cylindrical linear motors 2. The guide mechanism 32 is located inside the arrangement of the cylindrical linear motors 2. The number of guide mechanisms 32 is smaller than that of the cylindrical linear motors 2. According to the present embodiment, the single guide mechanism 32 is provided in the center of the arrangement of the cylindrical linear motors 2.

The guide mechanism 32 in accordance with the present embodiment is composed of the inner cylinder 26 of the motor support 25, a bush 15 that is a guiding portion fittingly fixed to the interior of the inner cylinder 26, and a guide shaft 13 that is a guided portion which is provided at the center of the coupling member 10, located at one end of the linear motor, and which is fitted in the bush 15 so as to be movable in the axial direction. The bush 15 constitutes a sliding bearing. The guide mechanism 32 has a rotation locking means 16 for inhibiting the rotation of the guide mechanism 32 with the moving member 30 relative to the motor support 25. The rotation locking means 16 is composed of a key groove 17 formed in the guide shaft 13 along the axial direction, and a key portion 18 fixed to the inner cylinder 26 of the motor support 25 and slidably engaging with the key 17. The guide shaft 13 may be provided on the coupling member 11, located on the output shaft 12 side.

In the linear motor 1 configured as described above, an excitation current is synchronously applied to the coil units 4 of the cylindrical linear motors 2, and the direction of the excitation current is switched between a positive side and a negative side to move the shaft members 3 of the cylindrical linear motors 2 forward and backward together with the coupling members 10, 11. The forward or backward movement of the coupling member 11 is extracted as a forward or backward output of the output shaft 12. Since the linear motor 1 has the plurality of cylindrical linear motors 2 arranged in parallel, it can provide high power in spite of the low power of each cylindrical linear motor 2.

Further, the guide mechanism 32, which guides the movement of the shaft members of the plurality of cylindrical linear motors 2, is positioned inside the arrangement of the cylindrical linear motors 2. The number of guide mechanisms 32 is smaller than that of the cylindrical linear motors 2. This results in a simpler configuration than the case where each of the cylindrical linear motors 2 has a guide mechanism, enabling a reduction in manufacturing costs. In particular, the present embodiment requires the single guide mechanism 32, providing a simpler structure.

The guide mechanism 32 is composed of the bush 15 and the guide shaft 13, provided in the motor support 25 and on the coupling member 10, respectively; the bush 15 is a guiding portion movable in the axial direction and the guide shaft 13 is a guided portion movable in the axial direction. The guide mechanism 32 thus has a compact, simple configuration. The single guide mechanism 32 is provided in the center of the arrangement of the cylindrical linear motors 2. This provides a more compact and simple configuration. In spite of the single configuration, the provision of the rotation locking mechanism 16 prevents the shaft members 3 of the plurality of cylindrical linear motors 2 coupled together by the coupling members 10, 11 from starting to rotate around the guide mechanism 32 to create a nonuniform gap between the shaft member 3 and the coil unit 4.

Figure 3:
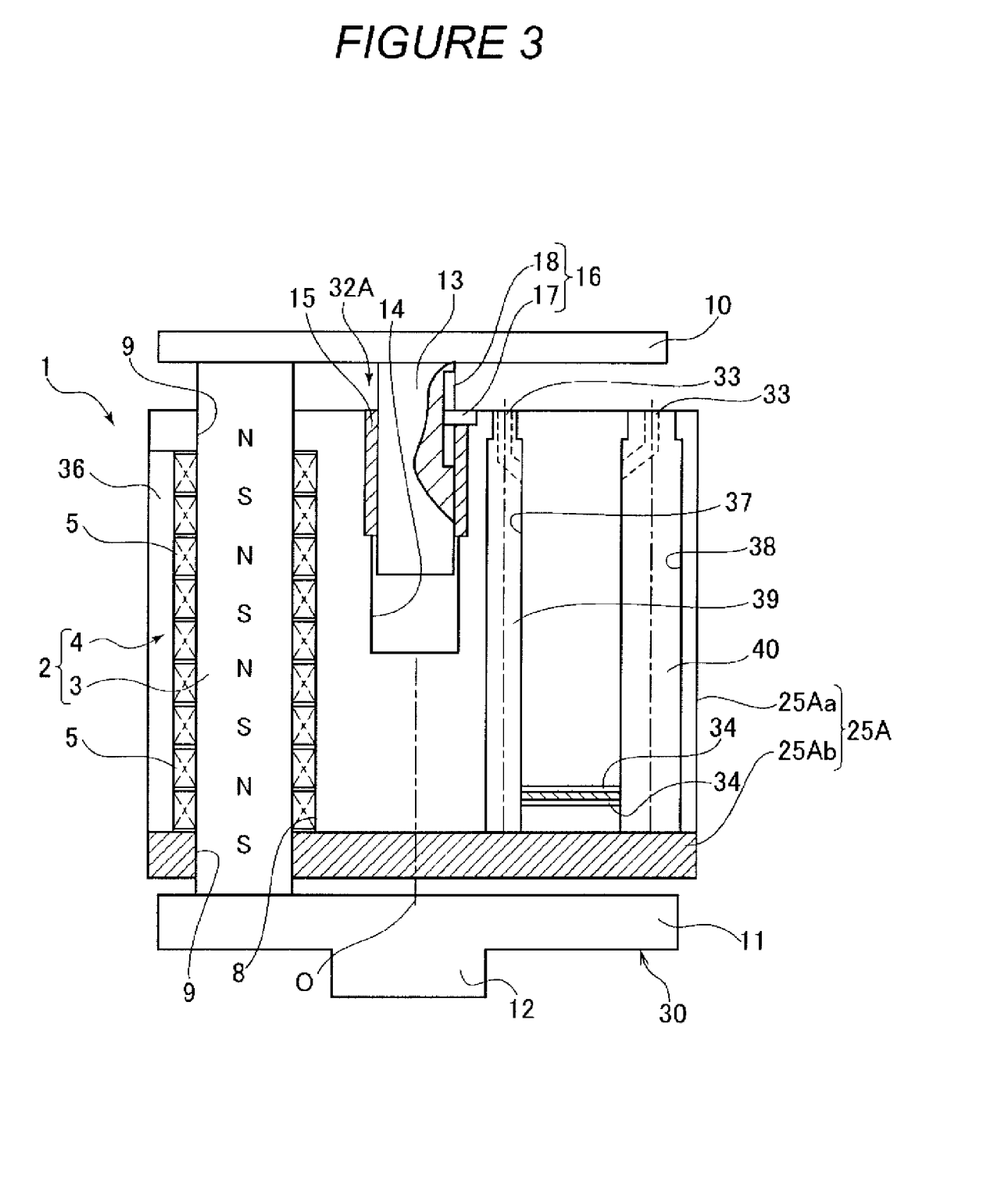
FIG. 3 is a vertical sectional view of a linear motor in accordance with another embodiment of the present invention.
Figure 4:
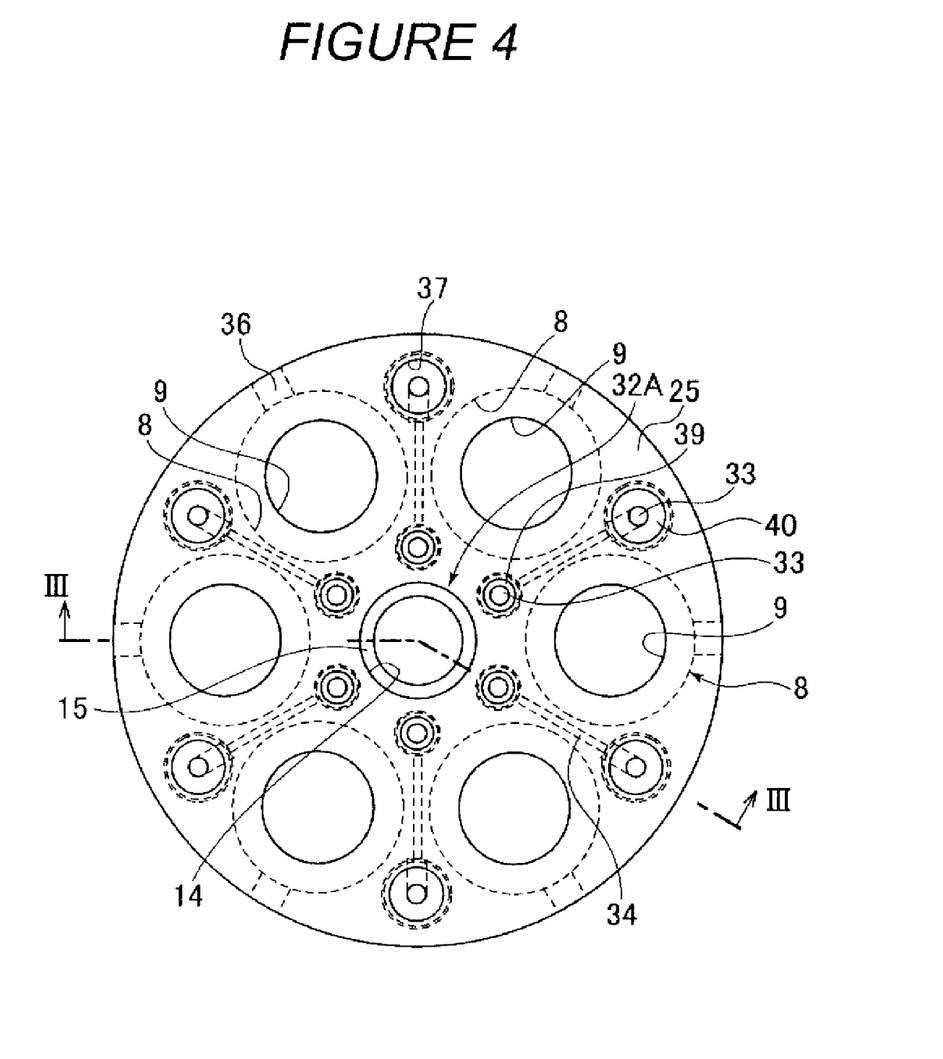
FIG. 4 is a plan view of a motor support also serving as a coil case for the linear motor.

FIG. 3 and FIG. 4 show another embodiment of the present invention. FIG. 3 is a sectional view of the entire motor taken along line III-III in FIG. 4. According to the present embodiment, the motor support 25A also serves as a coil case for the coil units 4 of the cylindrical linear motors 2. That is, the single motor support 25A also serving as a coil case is shared by the plurality of cylindrical linear motors 2. The coil units 4 of the cylindrical linear motors 2 are accommodated in a plurality of coil unit accommodating spaces 8 formed in the motor support 25A also serving as a coil case. In this case, the coil units 4 do not have their individual coil cases. Each of the coil unit accommodating spaces 8 is formed, as an annular recessed portion, around the periphery of a shaft member through-hole 9 penetrating the motor support 25A also serving as a coil case, from one end to the other end of the motor support 25A.

As is the case with the above embodiment, the moving member 30 is constructed by coupling the one ends of the shaft members 3 of the cylindrical linear motors 2 together using the coupling member 10, and coupling the other ends of the shaft members 3 of the cylindrical linear motors 2 using the coupling member 11. According to the present embodiment, in the guide mechanism 32A, the bush 15, serving as a guiding portion, is fitted into a guide hole 14 formed in the center of the motor support 25A also serving as a coil case. The guide shaft 13, provided on the coupling member 10, is fitted into the bush 15 so as to be movable in the axial direction. The rotation locking means 16 is composed of the key groove 17, formed around the outer periphery of the guide shaft 13, and the key portion 18, slidably engaging with the key groove 17 and thus fixed to the motor support 25A also serving as a coil case.

The motor support 25A also serving as a coil case is composed of a motor support main body 25Aa and a cover plate 25Ab, and the coil unit accommodating spaces 8 are arranged in the motor support main body 25Aa. Each of the coil unit accommodating spaces 8 has a wiring slit 36 formed in an outer peripheral surface of the motor support 25A. The wiring slit 36 is a space that accommodates the wires among the coils 5 in the coil unit 4 and a wire connecting the wires among the coils 5 to a motor power source.

Where the motor also serving as a coil case generates much heat, the motor may be water-cooled. However, forming a channel in the motor support main body is difficult and increases costs. In this regard, it is possible to use an inexpensive method for forming a channel as follows.

Channel partitioning bar through-holes 37 are formed at a plurality of points in an inner peripheral portion of the motor support main body 25A along its circumferential direction. Channel partitioning bar through-holes 38 are formed at a plurality of points in an outer peripheral portion of the motor support main body 25A along its circumferential direction. Channel partitioning bars 39, 40 are fitted in the channel partitioning bar through-holes 37, 38, respectively, with their base ends fixed to the cover plate 25A so that the channel positioning bars 39, 40 stand upright on the cover plate 25A. A bridging manifold 34 is formed between the adjacent channel partitioning bars 37, 38, that is, the outer channel partitioning bar 37 and the corresponding inner channel partitioning bar 38. Further, each of the channel partitioning bars 39, 40 has a channel groove (not shown in the drawing) extending along the axial direction and a channel 33 extending from the channel groove to the shaft end, where the channel 33 forms an opening. The channels 33 can be coupled together by joints or the like to inexpensively form water-cooling channels. The other arrangements of the present embodiment are similar to those of the first embodiment, shown in FIG. 1 and FIG. 2.

Where the motor support 25A also serves as a coil case for the coil units 4 as in the present embodiment, the linear motor 1 has a simpler configuration.

Figure 5:
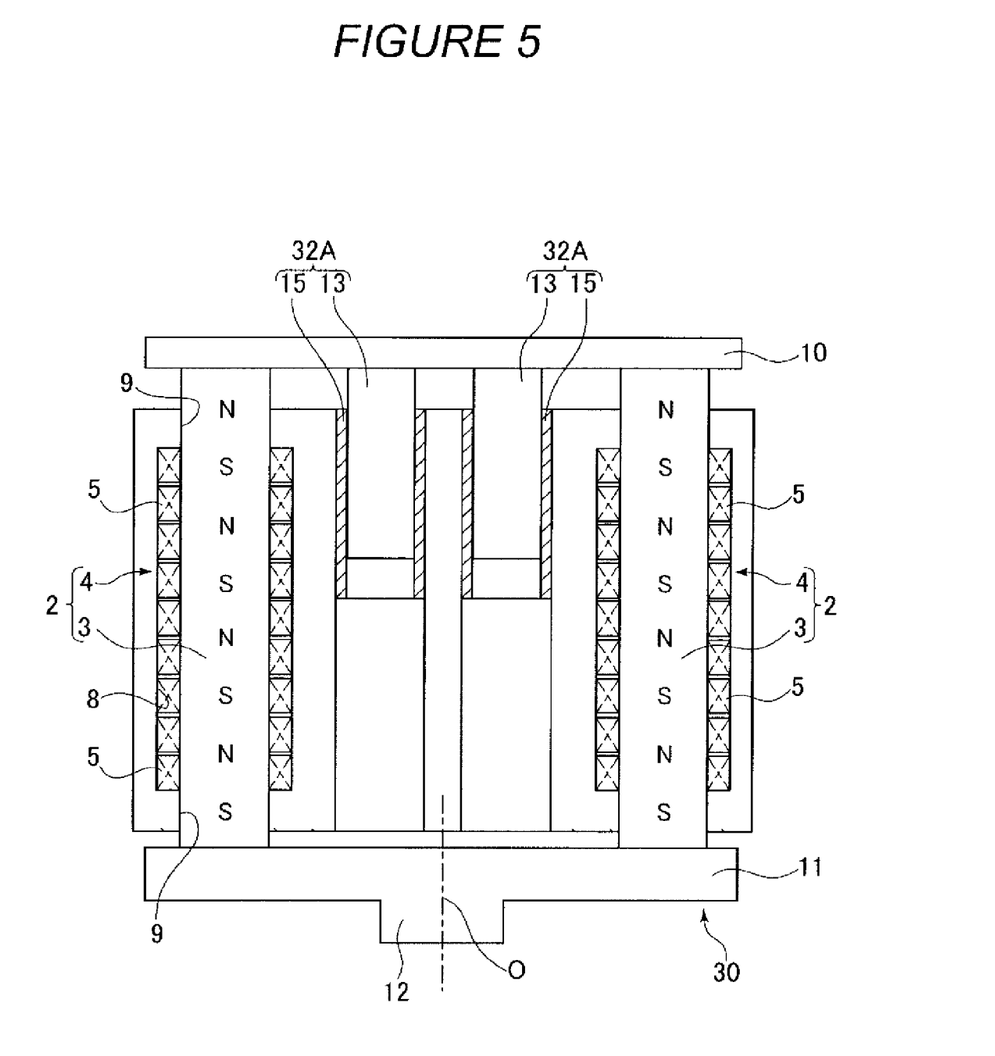
FIG. 5 is a vertical sectional view of a linear motor in accordance with yet another embodiment of the present invention.
Figure 6:
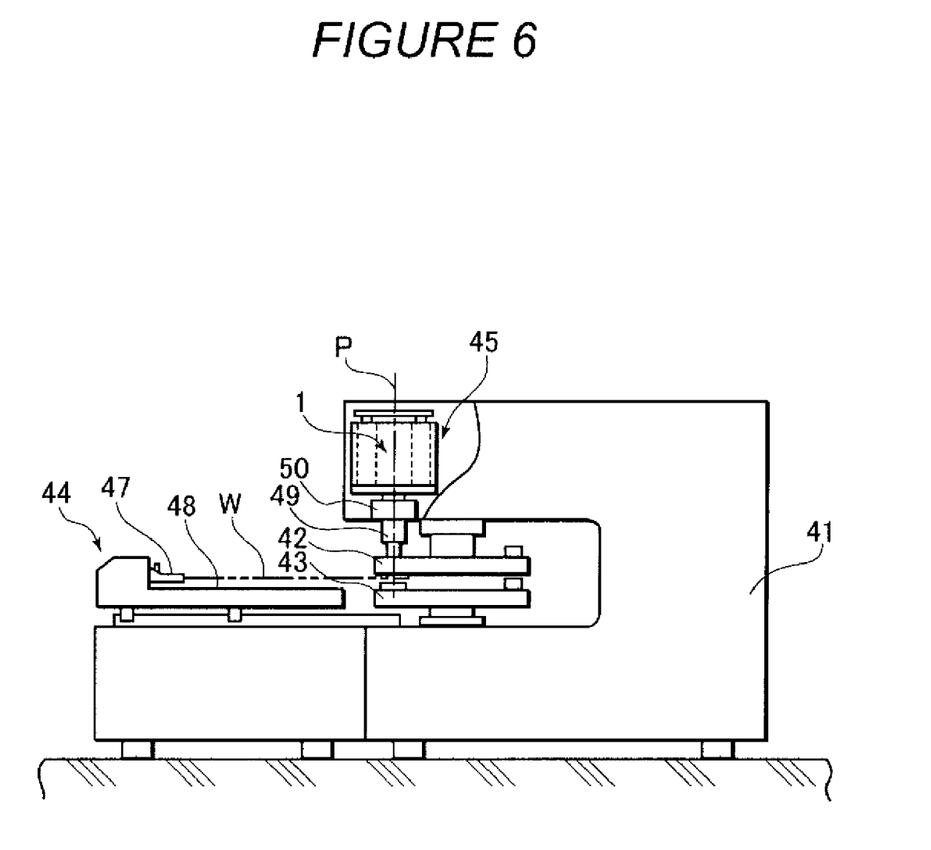
FIG. 6 is a side view of a press machine that is a machine tool using the linear motor in accordance with any of the embodiments of the present invention.

Each of the above embodiments uses the single guide mechanism 32, 32A. However, for example, as shown in FIG. 5, a plurality of guide mechanisms 32A may be provided. The provision of the plurality of guide mechanisms 32, 32A eliminates the need for the rotation locking means 16. Further, in the above embodiments, the cylindrical linear motors 2 are arranged on the circumference. However, the plurality of cylindrical linear motors may form a polygon, a straight line, a plurality of arrays, or the like.

FIG. 5 shows a press machine as an example of a machine toot using a linear motor as a driving source. The press machine has a frame 41, tool supports 42, 43 and a workpiece feeding mechanism 44 installed in the lower part of the frame, and a press mechanism 45 installed in the upper part of the frame 41 and using the linear motor 1 to serve as a press driving source.

The tool supports 42, 43 are made of an upper turret and a lower turret which are concentrically arranged. Punch tools and die tools are mounted on the upper and lower tool supports 42, 43, respectively, at a plurality of positions in the circumferential direction thereof. Each of the punch and die tools is indexed to a predetermined punch position P by rotating the tool supports 42, 43. The workpiece feeding mechanism 44 uses a work holder 47 to grip the edge of a workpiece W that is a plate material. The workpiece feeding mechanism 44 then moves the workpiece W forward, backward, rightward, or leftward on a table 48.

The press mechanism 45 supports a ram 49 that elevates and lowers the punch tool indexed to the punch position P on the tool support 42, so that the ram 49 can be elevated and lowered via a ram guide 50. The ram 49 is drivingly elevated and lowered by the linear motor 1. The linear motor 1 may be the first embodiment, described above with reference to FIG. 1, the second embodiment, described above with reference to FIG. 2 and FIG. 3, or the third embodiment, described above with reference to FIG. 5. The linear motor 1 has the coil unit 4 (FIG. 1) fixed to the frame 41 and the shaft member 3 combined to the ram 49, which serves as a movable portion. In the embodiment in FIG. 1, the coil case 7 is fixed to the frame 41, and the output shaft 12 is combined to the ram 49.

The press machine configured as described above uses the linear motor 1 as a press driving source. Thus, compared to press machines using a rotary motor, the present embodiment eliminates the need for a mechanism that converts rotation into the rectilinear motion of the ram 49. This reduces the number of parts required for the press mechanism 45, simplifying the configuration. Further, compared to press machines using a hydraulic cylinder as a press driving source, the present embodiment eliminates the need for a hydraulic unit, simplifying the configuration. Moreover, the linear motor 1 offers high positional accuracy, enabling high-quality, accurate machining.

The linear motor 1 in accordance with the present invention can be used not only in press machines but also in machine tools in general comprising a movable portion moving a tool or workpiece, to drive the movable portion. The linear motor 1 in accordance with the present invention can further be used as a driving source for various types of equipment.

While the present invention has been described with respect to preferred embodiments thereof, it will be apparent to those skilled in the art that the disclosed invention may be modified in numerous ways and may assume many embodiments other than those specifically set out and described above. Accordingly, it is intented by the appended claims to cover all modifications of the present invention that fall within the true spirit and scope of the invention.

The invention claimed is:

1. A linear motor comprising:
   a plurality of cylindrical linear motors each having a shaft member comprising a permanent magnet and a coil unit through which the shaft member is movable relative to the coil unit, wherein the shaft member includes a first end and a second end opposite to the first end;
   a motor support that is able to support the coil units of the plurality of cylindrical linear motors arranged in parallel,
   a first coupling member coupling together the first ends of the shaft members of said plurality of cylindrical linear motors;
   a second coupling member coupling together the second ends of the shaft members of said plurality of cylindrical linear motors; and
   a guide mechanism located inside the arrangement of said cylindrical linear motors so that the number of guide mechanisms is smaller than that of the cylindrical linear motors, the guide mechanism guiding movement of the shaft members of said cylindrical linear motors,
   wherein each of the plurality of cylindrical linear motors includes the shaft member different from the shaft member of the other cylindrical linear motors,
   wherein the guide mechanism is located between the first coupling member and the second coupling member, and
   wherein the guide mechanism is located inside the arrangement of said cylindrical linear motors in a cross sectional view perpendicular to an axial direction of said cylindrical linear motors.

2. A linear motor according to the claim 1, wherein said guide mechanism comprises a guiding portion and a guided portion which are provided on said motor support and said coupling member, respectively, and which are movable in an axial direction.

3. A linear motor according to the claim 2, wherein said single guide mechanism is provided in a center of the arrangement of said cylindrical linear motors and has a rotation locking means comprising an axial groove and a key portion that engages with the groove so as to be movable in an axial direction relative to the groove.

4. A linear motor mounted machine tool comprising:
   a linear motor; and
   a movable portion that is moved forward and backward by the linear motor to move a tool or a workpiece,
   wherein said linear motor comprises:
   a plurality of cylindrical linear motors each having a shaft member comprising a permanent magnet and a coil unit through which the shaft member is movable relative to the coil unit, wherein the shaft member includes a first end and a second end opposite to the first end;
   a motor support that is able to support the coil units of the plurality of cylindrical linear motors arranged in parallel;
   a first coupling member coupling together the first ends of the shaft members of said plurality of cylindrical linear motors;
   a second coupling member coupling together the second ends of the shaft members of said plurality of cylindrical linear motors; and
   a guide mechanism located inside the arrangement of said cylindrical linear motors so that the number of guide mechanisms is smaller than that of the cylindrical linear motors, the guide mechanism guiding movement of the shaft members of said cylindrical linear motors,
   wherein each of the plurality of cylindrical linear motors includes the shaft member different from the shaft member of the other cylindrical linear motors,
   wherein the guide mechanism is located between the first coupling member and the second coupling member, and
   wherein the guide mechanism is located inside the arrangement of said cylindrical linear motors in a cross sectional view perpendicular to an axial direction of said cylindrical linear motors.

* * * * *